Figure 4:
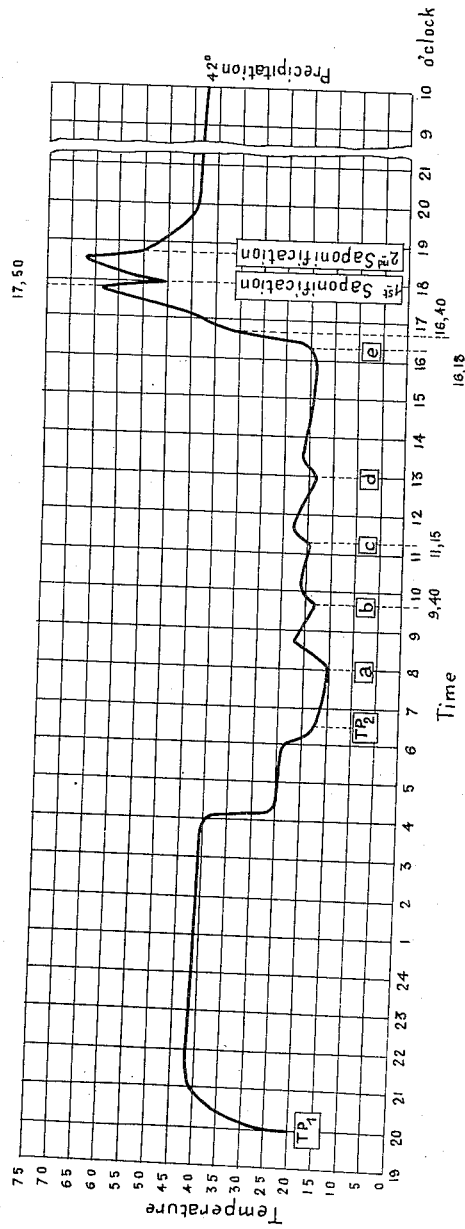

May 1, 1928.
H. L. BARTHÉLEMY
1,668,485
PROCESS FOR THE PREPARATION OF CELLULOSE ACETATE
Filed Jan. 30, 1928  2 Sheets-Sheet 1
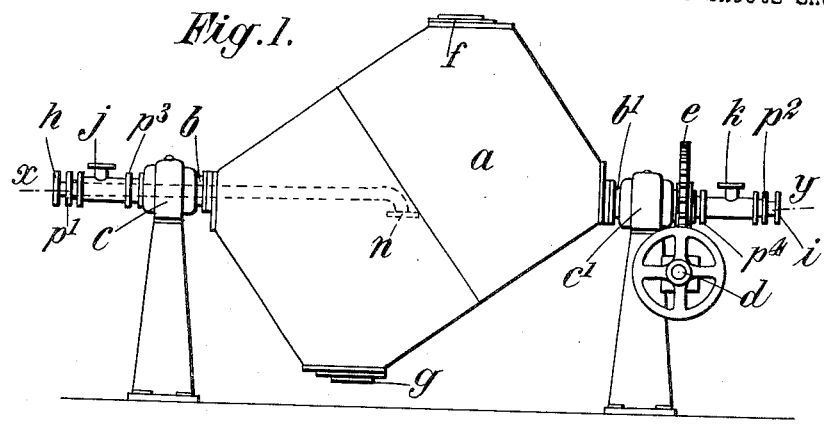
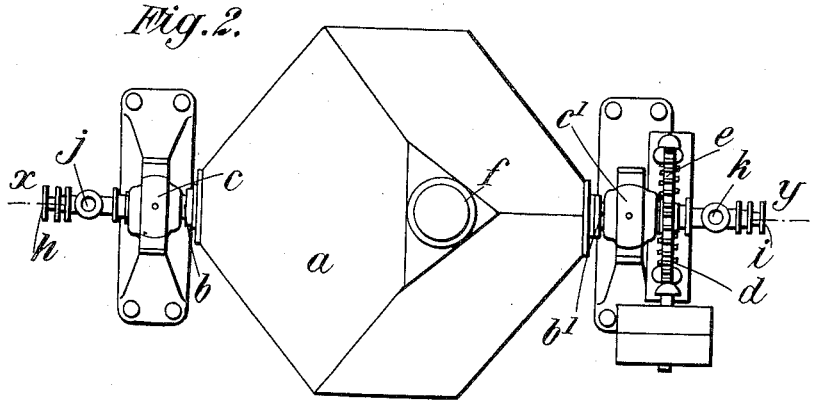
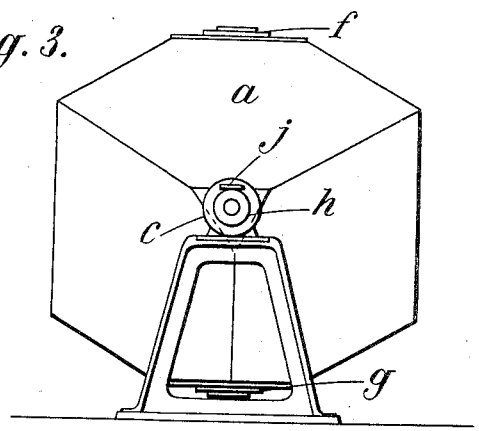
INVENTOR:
Henri Louis Barthélemy
BY
Alexander Powell
ATTORNEYS Patented May 1, 1928.

1,668,485

UNITED STATES PATENT OFFICE.

HENRI LOUIS BARTHÉLEMY, OF VERCELLI, ITALY, ASSIGNOR TO RUTH ALDO COMPANY INC., OF NEW YORK, N. Y., A CORPORATION OF NEW YORK.

PROCESS FOR THE PREPARATION OF CELLULOSE ACETATE.

Application filed January 30, 1928. Serial No. 250,632.

This invention relates to a general method of preparing cellulose acetate.

In the chemical transformations of cellulose in general, I have found that the formation of hydrocelluloses gives rise to products of inferior physical characteristics, especially with regard to resistance to tractive force, folding and elongation. The conviction arises that these results are due to the fact that the working materials are crystalline solutions, instead of colloidal solutions. In all cases the molecular structure of the cellulose is so strongly attacked that the state of condensation or polymerization is carried too far from the initial condition.

I have observed that the presence of oxycelluloses produces the opposite results, in the absence of hydrocelluloses. In such case a considerable improvement is noticeable in the physical characteristics of the final product.

It has also been observed that if the acetylation is controlled in such a manner as to avoid a rise of temperature to more than 23 or 26° C. before the proportion of fixed acetyl has passed beyond 25% the physical characteristics of the final product are also improved. If, on the contrary, there is any sudden rise in temperature, the resulting product is defective, even though said sudden rise is restricted to merely a few spots in the mass, while this product is heterogeneous.

Precisely with a view to preventing these sudden rises in temperature and to enable control of the thermo-chemical development of the reaction and of the quantity of fixed acetic acid to be maintained, I have, in my researches, utilized the law of mass action, by adding the reactive products in a gradual manner, and regulating said addition as a function of the changes of temperature ascertained systematically with the thermometer.

Moreover, I have ascertained that the presence of cellulose sulphates in the final mixture of the acetates, in addition to its effect of impairing the stability of the final product in course of time, also lowers the physical characteristics.

In principle, the present invention consists in conducting the entire acetylation treatment under conditions adapted to:—

(1) Reduce to a minimum the amount of any hydrocelluloses that may be formed or an excess of polymerized cellulose;

(2) Facilitate, within the optimum limits and at the desired moments, the action of oxygen on the cellulose;

(3) Ensure continued control over the thermal reaction, in maintaining the temperature within the desired limits, by a systematic observation of the temperatures and by applying the law of mass action; and arranging the different baths in respect of quantities, time and compositions in accordance with the laws of esterification so that it is possible to obtain in each step only the previously determined number of acetyl groups, and proceeding exclusively in successive steps;

(4) Transform, in the cases where the catalyzer employed is sulphuric acid and at opportune moments, the cellulose sulphates into other cellulose esters free from the inconveniences attaching to the sulphates;

(5) Employ mechanical devices enabling the mass of the reactive agents to diffuse and mix under conditions favourable to the esterification belonging to (3) above. The special devices are without interior mixing organs, fixed or movable. The absence of such organs, and the absence of attrition between them and the pulp prevents any elevation of temperature arising from such attrition. This disadvantage in apparatus hitherto employed is well known and necessitates cooling action.

(6) Subject the originating material to a preliminary treatment ensuring better contact between the fibres and the reagents, in order to facilitate the application of the law of Gulberg and de Waage from the beginning of the treatment.

I had previously recognized that the separate and partial application of certain of these operative conditions to the processes already known furnishes interesting results. These applications have formed in particular the subject matter of the following U. S. patent applications in my name:—Serial Nos. 209,167; 209,166; 209,161; 209,162; filed 28th July, 1927, and Nos. 249,988; 249,985, and 249,987, filed 27th January, 1928.

After having ascertained that the separate and partial application of any one of the conditions defined above to the known processes showed itself to be particularly advantageous, I wished to find out whether the integral application of these conditions of treatment, or the partial, and simultaneous, application of several of them, was attended by practical imcompatibilities.

In this connection I ascertained that the conditions are not in any way contradictory, and also that their integral application in a continuous cycle of operations furnishes advantageous results, very superior to those obtained in the processes already known.

Accordingly, the present invention is a process of preparing cellulose acetates in a continuous cycle of operations, consisting in first subjecting cellulose to the action of an oxidizing agent, then treating the mass to soften the fibres, then effecting acetylation by the application of the law of mass action with reagents added gradually in proportions depending on observed temperatures, then effecting saponification in the presence of a hydro-acid to ensure elimination of sulphates and afterwards precipitating the acetic sol.

As raw material there is employed cotton fibres, linters conveniently prepared, or pulp. This material is in the first stage of the complete process subjected to an oxidizing action now to be described.

*Oxidation of raw material.*

This consists in subjecting the cellulose mass to the action of a direct oxidizing agent, or an alkaline base but in the presence of a moderating agent. The latter is absolutely essential because experiments have shown that when the raw material is simply subjected to a single direct oxidizing agent in the presence only of one alkaline base, alkali-cellulose is almost invariably formed. To avoid such formation and the resulting disadvantages, I carry out this stage of the treatment in the presence of a moderating agent which modifies the state of ionization of the media.

As direct oxidizing agent there may be employed sodium peroxide, or any alkali peroxide, a perborate, hydrogen peroxide, or the like.

As base there may be employed a lye of soda or of potash or the like.

As moderating agent there may be employed alkali carbonates, silicates, resinates, alkali soaps, sodium- or ammonium-sulphoricinates etc.

This stage of the process has the effect of increasing the copper value and decreasing the viscosity of the cellulose ester. Experience shows that raw material treated in the manner just described is also better able to retard the degradating action of certain hydrolyzing agents. Following oxidation the mass is subjected to a so-called preliminary treatment now to be referred to.

*Preliminary treatment.*

One of my objects, in general, is to carry out the reaction uniformly throughout the mass. For this it is necessary that the liquid agents added to the material shall distribute themselves rapidly through the whole mass. In this connection it is necessary that the permeability or the osmotic permeability of the skin of the cellulose fibres shall be the greatest possible.

It may be stated that many preliminary treatments for cellulose prior to acetylation have been proposed but these have mainly in view a chemical modification of the cellulose and none are adapted to give the same results as the preliminary treatment now to be described. Further, these known treatments are totally different from the present treatment. This consists in submitting the cellulose mass (previously subjected to an oxidizing action as hereinbefore stated) in the acetylizer itself to a stream of vapour of acetic acid alone or one or more halogens alone or to a mixture of these. Generally the treatment is carried out:

(1) By introducing the halogens, in the form of gas or vapour, into the mass of dry cotton prior to vaporization or atomization of acetic acid therein.

(2) By introducing acetic vapours simultaneously with the introduction of halogen vapours.

(3) By introducing acetic vapours in the first place, followed by the introduction of halogen vapours in the second place.

(4) By vaporizing, atomizing or nebulizing the mixture (in strictly determined proportions) of the halogen element, or elements, and the acetic acid. Chlorine combines only very slowly, if at all, with pure acetic acid out of contact with light and in the absence of chlorination catalyzers such as sulphur or iodine, and it is therefore possible to prepare such solutions several days in advance and to keep them in a comparatively satisfactory condition.

The nebulizing of the glacial acetic acid can be effected by means of apparatus producing a fine and relatively stable mist. For this purpose, use may advantageously be made of the apparatus described in Ullmann's "Encyclopadie der technischen Chemie," vol. 4, page 283, lines 39 et seq.

An important feature of the preliminary treatment is that it enables a considerably smaller amount of sulphuric acid to be employed in the subsequent acetylation bath and practically eliminates the retention of fibres in their original form, the whole of the mass being completely and uniformly esterified.

The next stage is:—

Acetylation.

The difficulty of acetylation depends on the fact that esterification of cellulose or its derivatives is not at once a system of reaction in homogeneous equilibrium, the mono- and the di-acetates formed at first being, indeed, insoluble in the acetylating medium. Moreover, seeing that the acetylation is a very highly exothermic reaction the homogeneity of the final products depends for the most part on the skill with which the acetylation is performed—that is to say, the skill with which local rises in temperature are prevented. These rises occur all the more readily at the commencement of the esterification because the cotton remains a bad conductor of heat until it has become thoroughly soaked.

By the present method I can control and lead the chemical and thermal reactions. The method consists in adding to the cellulose a succession of complete acetylating baths, that is to say, baths containing a catalyzer, acetic anhydride and a diluent such as acetic acid. The manner of operation is such that the heat of the reaction is readily dissipated mainly during the formation of the cellulose mono- and di-acetates. This is done without the necessity of resorting to a preliminary hydrolysis. The success of this stage of the complete operation is assured by the preceding treatment for softening the fibres.

In bringing about a succession of conditions of chemical equilibrium which, while differing slightly from one another, are nevertheless sufficiently removed for the rises in temperature not to exceed 5 or 6° C., so long as the amount of the acetyl radicles combined has not reached 25%, the heat of the reaction is perfectly subdivided and absorbed; and, moreover, the acetylation proceeds slowly and in a completely homogeneous and progressive manner throughout the whole mass, without any danger of any parts being too far advanced or lagging behind.

As the reaction is bimolecular, it is conceivable that, with a succession of baths of different composition and employed at sufficient intervals of time, it is mathematically possible to control the acetylation so that it passes through a series of values, determined by the experimental conditions, and to dissipate with ease the amount of heat units liberated by the esterification, said heat units being determined by the composition of the various acetylating baths.

Each state of equilibrium of the system is regulated, in perfect harmony with each bath by the Gulberg and de Waage law.

As catalyzer is employed sulphuric acid alone or in association with a modifying agent such as halogen or an oxidizing agent.

The employment of an oxidizing agent is based upon the discovery that it is quite possible to vary the course of the acetylation of cotton without having to modify the process or the various quantities of the reagents. All that is needed is to add to the customary catalyzer, for instance sulphuric acid, a substance which effects a very slight oxidation in the interior of the fibres during the esterification. This oxidation can be regulated at will by accurately proportioning the amount of such addition.

This association of the catalyzer with the auxiliary substance produces a kind of mixed catalysis, the ordinary hydrolysis effected by the catalyzer when used alone being here replaced by an oxyhydrolysis of the fibre.

Contrary to a priori expectation, the mechanical and plastic properties of the acetylcellulose do not suffer by such treatment, but are retained in a high degree provided a well devised working method be employed, an express condition being that the amount of active oxygen employed does not exceed 0.3% of the weight of the cotton.

It has also been ascertained that the acetate obtained by suitable treatment is far whiter than that obtainable from the corresponding strongly bleached cotton. This is a further novel and considerable advantage if the acetate is to be converted into brightly coloured plastic materials or into artificial silk.

The following oxidation agents, for example, may be employed in conjunction with an ordinary catalyzer:

Manganese sulphates; manganic acetate; chromic acid; monopersulphuric acid, so-called Caro acid; manganic acid and permanganic acid; peracetic acid; and so on.

These substances are obtained by decomposing—preferably at a temperature of about 0° C.—their alkali salts with the theoretical quantity of sulphuric acid in an acetic medium.

In all cases, whether the sulphuric acid is employed as catalyzer alone or with other agents, in the composition of the different baths, the amount of sulphuric acid is progressively increased, and that, too, at the commencement of the esterification; because I have recognized that the fact of esterifying the cellulose progressively enables it to stand progressively increasing amounts of the catalyzer. At the outset, the operation is conducted with very small amounts of sulphuric acid, associated preferably with halogens. This association should preferably occur in the first stages of esterification, before the acetyl content exceeds about 10%. The fact of the halogens being employed in direct association enables a considerable reduction to be effected in the quantity of the sulphuric acid which, as is known, causes the formation of cellulose sulphates, the stability of which is mediocre, and which make the acetates difficult to store.

Although the catalytic action of the halogens is known, it has never yet been utilized in this manner, in admixture with sulphuric acid in the first phase of the acetylation operation.

In carrying out acetylation as a step of the present process, the range of temperatures is clearly restricted, my experiments having demonstrated that the rate of fixation of the acetyl radicles on the cellulose complex already partially acetylated must only be increased very gradually, failing which the products obtained may differ totally in character. Two partially acetylated celluloses will exhibit a notable difference in the rate and intensity of acetylation during their successive periods of esterification if they were not, at the outset, in the same condition of richness in acetyl groups and were not at the same temperature. The accuracy of this observation persists even when the said partial initial acetylation has been effected in the same bath and at the same temperature.

I limit the temperature of the reaction to between 18 and 26° during the preparation of the cellulose acetates with an acetyl content between 0 and 11.70% (monoacetate in C 12). In the preparation of the di, tri and up to the tetracetate of cellulose, the temperature is preferably maintained between 20 and 35°. Finally, in order ultimately to obtain the penta- and hexacetates of cellulose without being obliged to employ too great an excess of acetic anhydride, the temperature may be allowed to rise, without inconvenience, to 55–65° C. This elevation of the temperature is then no longer attended with any danger to the cellulose complex, which is already in an advanced and uniform stage of acetylation which protects it from the rough action of the catalyzers.

These different results cannot be obtained except by a series of additions, in so to speak elementary quantities. The composition of these additions, and the amount and number of each may be as in the examples hereinafter set forth.

The next stage in the complete process is:—

Saponification.

The use of sulphuric acid as catalyzer in the acetylating stage leads to the production of products which are of technically good appearance. Nevertheless, sulphuric acid exhibits serious drawbacks which do not become manifest until after a considerable time. Just as the stability of gun cottons and nitrocelluloses generally depends, for the most part, on the small amount of sulphuric esters formed during the nitration (Herve, Moniteur Quesneville, September, 1918), it has been noticed that the stability of the acetyl- and nitrocelluloses prepared in the presence of sulphuric acid is mainly dependent on the same cause, and that acetates which are perfect during the first years following their preparation, become more and more acid in the course of time, owing to the presence of unstable sulphuric esters of the cellulose, until they finally become entirely useless for the customary purposes, having lost their tenacity. It is for this reason that in the foregoing I have used every care to reduce the amount of sulphuric acid used.

The present method of saponification consists in modifying the process of retrogression or partial saponification so as to bring about the destruction of the sulphuric esters during the actual manufacture of the cellulose acetate. In spite of the care previously taken, sulphuric esters are found still to exist after acetylation but in much smaller quantities than would otherwise be the case.

I effect saponification in two stages. In the first stage an aqueous solution of acetic or formic acid is intimately and progressively incorporated with the limpid and viscous mass already acetylated in the manner hereinbefore described. The acid solution is so calculated that the amount of water thereby introduced is just sufficient completely to decompose the excess of acetic anhydride while the amount of acid will prevent incipient flocculation. The mass is then cooled to approximately the initial temperature so as to prevent alteration of the acetylcellulose during the second saponification stage.

Said second stage consists in incorporating with the mass a fresh quantity of an aqueous solution of acetic, or formic, acid, but containing, this time, a quantity of hydrochloric acid, preferably accompanied by hydrofluoric acid, the whole being calculated so that the number of hydrogen ions introduced thereby is at least equal or superior to the hydrogen ions introduced by the sulphuric acid primarily employed as the esterifying catalyzer. Moreover, the relative proportions of the whole are so calculated that the amount of water present in the entire mass will be between 5 and 15% of the total amount of the organic acids present after the last drop of the second bath has been introduced.

Under these conditions, and in time, the partial saponification of the acetylcellulose proceeds in a homogeneous manner and is accompanied by the destruction of the aceto-sulphuric esters of the cellulose.

If desired, the operation may be accelerated by slightly raising the temperature.

*Precipitation etc.*

After the aforesaid saponification operation the acetic sol produced is precipitated in water or any other flocculating agent followed by a sufficient number of washings before transferring the acetate to the drier to complete the process.

For the purpose of carrying out the process described use is advantageously made of the special rotary apparatus forming the subject matter of my U. S. patent applications Serial No. 209,164, filed 28th July, 1927, and Serial No. 249,986, filed 27th January, 1928. In this apparatus the surfaces in contact with the substances undergoing treatment are unevenly or irregularly distributed with respect to the axis of rotation.

One constructional form of the apparatus is shown on the accompanying drawing, Fig. 1 being a front elevation, Fig. 2 a plan, and Fig. 3 an end elevation.

Briefly, the apparatus comprises a hollow parallelepiped body $a$, constructed of a metal which is inert towards the acetylating agents, and arranged to turn on a rotational axis X—Y passing through two opposite apices. Secured to the body $a$ at said apices, are two hollow trunnions $b:b^1$ which are supported in two bearing pillars $c:c^1$ that take the entire weight of the apparatus.

Rotational movement is imparted to the body $a$ by a worm $d$ which meshes with a helicoidal pinion $e$ keyed on the trunnion $b^1$. This movement may evidently be transmitted to the body $a$ through any other suitable means, such as a train of speed-reducing gear. Moreover, a lateral flywheel may also be keyed on one of the trunnions in order to absorb the intermittent strains set up in that trunnion when the apparatus is working under full load.

Openings $f$ and $g$ permit the introduction of the cotton and the removal of the acetic sol. The liquid or gaseous reagents intended to act on the cotton during the rotational movement of the apparatus, are admitted at $h$, whilst the orifice $i$ ensures communication between the interior of the hollow rotary body $a$ and either the atmosphere or a chamber connected with a vacuum pump.

For the purpose of cooling and heating the apparatus as required, the rotary body $a$ is surrounded by an outer jacket, which has no communication with the interior of the rotary body and may, therefore, be made of cast iron or even sheet iron, for reasons of economy. Circulation of hot or cold water, steam or hot gases, is ensured by admission and discharge orifices in tubes $j$ and $k$, both of which communicate with the jacket and are concentric with the tubes $h$ and $i$. Tight joints for the entire circulation and admission system are ensured by means of stuffing boxes. From the foregoing description it will be clearly understood that all displacement and mixing of the acetylating mass is effected by the interaction of gravity and the different inclinations of the walls of the rotary container, but without mixing organs, fixed or movable. This interaction gives complete and uniform mixing. By this means there is prevented the elevation of temperature that always accompanies the action of fixed or movable mechanical mixing organs. It is well known in the paper making industry and in the cellulose transformation industry that this elevation of temperature increases with the proportion of the fibre to liquid in the mass. It has been explained that such rise in temperature is particularly to be avoided in the early stages of acetylation just when the proportion of fibre to liquid is highest. From these remarks it is easy to understand that the result of employing the described apparatus is completely in accord with the fundamental conception of my process, namely, to prevent elevation of temperature.

To conclude, a single practical example of the complete process will now be given.

*Example.*

1. Preparation of the originating material:—

100 kg. of linters, boiled in an autoclave with weak soda lye and sodium resinate, and having the chemical constants Hemicelluloses _____ 1.19
Copper value_____ 0.65 are immersed, for example, in 2000 litres of an aqueous solution containing

Caustic soda _____ 10 kg.
Marseilles soap_____ 6 "
Hydrogen peroxide (10% vol.)_____ 100 "

After 24 hours' contact and steeping at 17–23°, with continuous agitation in a leviathan washer, the bath liquor is emptied in order to be replenished, and the cotton is thoroughly washed. After centrifuging and drying, 99.5 kg. of perfectly white cotton are obtained, having the modified constants Hemicellulose_____ 1.14
Copper value_____ 0.79

2. Charging:—

The cotton treated in the above manner and containing only 1.8% of moisture, is introduced into the apparatus shown in Figs. 1–3, through the charging aperture $f$. The apparatus is hermetically closed and is set in motion, the motion being continued up to the time at which the precipitation of the acetylcellulose is completed.

3. Preliminary treatment:—

Through the pipe $n$ of the apparatus, which is fixed by means of the stuffing box $p^1$, and say at the hour 20 on the graph represented in Fig. 4, 50 kg. of 99% glacial acetic acid are vaporized by heat, so as to cause uniform swelling and penetration of the cotton.

As revealed by the curve of temperatures as a function of the time, the internal temperature attains 42° C. towards the hour 21.30, and remains at about 40° up to about 4 a. m., at which hour a current of cold water is passed round the reaction chamber by means of the intake and outlet orifices $j$ and $k$, arranged in the stuffing boxes $p^3$ and $p^4$. The temperature falls rapidly to 25° C., and is maintained thereat until 6 o'clock, the cooling being then accelerated. At 6.30 (TP2 on the graph Fig. 4), 50 kg. of 99% glacial acetic acid, in which 125 grms of chlorine gas have been dissolved in the dark and in the cold, are nebulized.

4. The acetylation treatment:—

At 8 o'clock, a first acetylation bath composed of (a) Glacial acetic acid (99%)____ 91 litres.
    Acetic anhydride (93%)____ 25 "
    Chromic acid_____ 500 grms.
    Sulphuric acid (95.5%)_____ 0.100 liters.

is nebulized by means of the interior atomizer $n$, without stopping the rotary motion of the apparatus.

It will be noticed from the graph that the addition of this first bath causes a rise in temperature from 15° to 22° C. This rise is not instantaneous, owing to the calorific inertia due to the large mass of cotton in reaction and the progressive character of the treatment.

This first acetylation of the cotton is characterized by the formation of a cellulose acetate which, when washed and dried, has the low acetyl value 1.03% ($CH_3-CO-$).

At 9.40, the second acetylation bath composed of:—

(b) Glacial acetic acid (99%)____ 94 litres.
    Acetic anhydride (93%)____ 25.500 "
    Sulphuric acid (95.5%)____ 0.140 "
    Bromine_____ 0.060 kilograms.

is introduced in the same manner.

Under the influence of this bath the temperature again rises, from 18° to 21°. After chemical equilibrium has been established between the various constituents present, and at the temperature under consideration, the new acetyl value is found to be 2.86%.

At 11.15, the third acetylation bath, composed of (c) Glacial acetic acid (99%)____ 81 litres.
    Acetic anhydride (93%)____ 7 "
    Sulphuric acid (95.5%)____ 0.560 litres.

is introduced.

It will be noticed in the graph that, in spite of the sudden increase in the amount of the catalyzer, as compared with the preceding bath, the reaction is perfectly balanced from the thermal point of view, the temperature rising only from 19° to 23°.

After equilibrium has been restored, this new acetylation is characterized by the acetyl value 9.86%.

At 13 o'clock on the graph, the fourth acetylation bath is introduced, consisting of (d) Glacial acetic acid (99%)____ 76 litres.
    Acetic anhydride (93%)____ 12 "
    Sulphuric acid (95.5%)____ 0.910 "

As before, notwithstanding the fresh increase in the amount of catalyzer, the reaction remains perfectly balanced. The acetylation proceeds quietly. The temperature rises from 18° to 21°; and after equilibrium is restored, the resulting new cellulose acetate is characterized by Acetyl value_____ 20.75%
Combined sulphuric acid_____ 0.53%

This shows, by the way, how relatively small is the amount of the cellulose sulphates formed in relation to the acetic acid fixed. This small quantity will be easily eliminated later by the saponification hereinafter described.

The acetate examined, at this moment, under polarized light, exhibits alternations of light and shade, resembling incipient points of "striction." A large portion of the fibres, moreover, have shrunk, indicating that the dispersion of the colloidal structure is commencing in the bath.

At 16.18, the fifth acetylation bath is introduced, composed of (e) Glacial acetic acid (99%)____ 10 litres.
    Acetic anhydride (93%)____ 196 "
    Sulphuric acid (95.5%)____ 0.090 "

The temperature is allowed to rise spontaneously at first, the fibre being in no wise endangered thereby, since it is now protected, by a solid acetylation, against any alteration which might cause molecular degradation through the influence of the catalyzers present.

At 16.40, the mass assumes the condition of a thick pulp, which is translucent and perfectly homogeneous. The apparatus is then reheated, so as rapidly to attain the limit of esterification. At 17.50 there will be observed a point reaching 63° C., followed at once by a drop to 50° C. At this moment, the whole mass is in the form of a thick acetic syrup, which is clear and refractive.

A precipitated, washed and dried sample gives the acetyl value 45.27%, corresponding approximately to hexacellulose with 12C.

5. Saponification treatment:—

At 18, there is introduced, for the purpose of destroying the surplus acetic anhydride, a first bath consisting simply of 125 litres of 60% acetic acid, the remaining 40% being water.

The elimination of the surplus anhydride causes a fairly rapid rise in temperature to 67/68° C., but followed immediately by a sudden fall.

When the temperature has returned to about 55°, the following second saponification bath is introduced:

| | | |
|---|---|---|
| Acetic acid (100%) | 78 | litres. |
| Water | 47.600 | " |
| Hydrochloric acid (31%) | 7.000 | " |
| Hydrofluoric acid (40%) | 0.500 | " |

The temperature is maintained at about 41–43° C. all night; and in the morning the progress of the saponification is followed by the known methods of investigation.

The graph shows that the operation has ceased at 11 a. m.

At this moment, the acetic sol is flocculated by 2500 litres of water containing 1% of sodium bicarbonate.

After repeated washings with clean water, and drying (well known operations) about 148–150 kg. of cellulose acetate are obtained showing

| | |
|---|---|
| Acetyl value | 39.50% |
| Sulphuric acid in combination | 0.013% |

This illustrates, in passing, the destructive action of the hydrochloric acid and hydrofluoric acid on the cellulose sulphates, an effect which is analogous to that observed by Herve (Moniteur Quesneville, 1919) in the case of nitrocelluloses.

The present example is given, of course, as indicational and the invention is not restricted thereto.

I claim:—

1. A process of preparing cellulose acetates, consisting in first subjecting cellulose to the action of an alkaline solution containing peroxides and a soap which will diminish the superficial contact tension and facilitate the diffusion of nascent oxygen then treating the mass to soften the fibres by subjecting the mass to the action of a halogen and vapor of acetic acid, then effecting acetylation in a series of steps in such manner that each successive step is performed after the chemical reaction of the preceding step has attained substantial equilibrium, the amount of acetic acid and catalyst containing sulphuric acid used in the bath being determined by the number of acetyl groups which must be present in the cellulose mass at the end of each addition; then effecting saponification in the presence of hydrochloric acid to ensure elimination of sulphates and afterwards precipitating the acetic sol.

2. A process of preparing cellulose acetates, consisting in first subjecting cellulose to the action of an alkaline solution containing a mixture of peroxides and a soap which will modify the state ionization of the medium and prevent the formation of alkali cellulose and diminish the superficial contact tension and facilitate the diffusion of nascent oxygen; then treating the mass to soften the fibres by subjecting the mass to the action of a halogen and vapor of acetic acid, then effecting acetylation in a series of steps in such manner that each successive step is performed after the chemical reaction of the preceding step has attained a substantial equilibrium, then effecting saponification in the presence of hydrochloric acid to ensure elimination of sulphates, and afterwards precipitating the acetic sol.

3. A process of preparing cellulose acetates, consisting in first subjecting cellulose to an alkaline solution containing the peroxides and a soap which will modify the state of ionization of the medium and prevent the formation of alkali cellulose, and diminish the superficial contact tension and facilitate the diffusion of nascent oxygen; then treating the mass to soften the fibers by subjecting the mass to the action of a halogen and vapor of acetic acid, then effecting acetylation in a series of steps in such manner that each successive step is performed after the chemical reaction of the preceding step has attained a substantial equilibrium, then effecting saponification in two stages, the first consisting in destroying the excess of acetic anhydride by the addition of a dilute solution of acetic acid and the second consisting in adding an aqueous solution of an organic acid containing sufficient hydrochloric acid to ensure that the number of hydrogen ions introduced thereby is not less than the number introduced by the primary catalyzer, and finally precipitating the acetic sol.

4. A process of preparing cellulose acetates, consisting in first subjecting cellulose to the action of an alkaline solution containing peroxides and a soap which will modify the state of ionization of the medium and prevent the formation of alkali cellulose and diminish the superficial contact tension and facilitate the diffusion of nascent oxygen; then treating the mass to soften the fibres by subjecting the mass to the action of a gaseous halogen and vapor of acetic acid; then effecting acetylation in a series of steps in such manner that each successive step is performed after the chemical reaction of the preceding step has attained a substantial equilibrium; then effecting saponification in two stages, the first consisting in destroying the excess of acetic anhydride by the addition of a dilute solution of acetic acid and the second consisting in adding an aqueous solution of an organic acid containing sufficient hydrochloric acid to ensure that the number of hydrogen ions introduced thereby is not less than the number introduced by the primary catalyzer, and afterwards precipitating the acetic sol.

5. A process of preparing cellulose acetates, consisting in first subjecting cellulose to the action of an alkaline solution containing peroxides and a soap which will modify the state of ionization of the medium and prevent the formation of alkali cellulose, and diminish the superficial contact tension and facilitate the diffusion of nascent oxygen; then subjecting the mass to the action of gaseous chlorine and vapor of acetic acid; then effecting acetylation in a series of steps or baths each bath containing a mixture of an acetylating agent, a catalyst containing sulphuric acid, each successive bath being performed after the chemical reaction of the preceding step has attained substantial equilibrium; then effecting saponification in two stages, the first consisting in destroying the excess of acetic anhydride by adding diluted acetic acid, and the second consisting in adding an aqueous solution of an organic acid containing sufficient hydro-acid to ensure that the number of hydrogen ions introduced thereby is not less than the number introduced by the primary catalyzer.

6. The herein described process of preparing cellulose acetate, consisting in first subjecting the cellulose material to the action of an alkaline solution containing peroxides; and a soap which will modify the state of ionization of the medium and prevent the formation of alkali cellulose, and diminish the superficial contact tension and facilitate the diffusion of nascent oxygen, then treating the mass with gaseous halogen and vapors of acetic acid; then subjecting the mass to a series of successive partial acetylation baths, each addition of acetylating agents being deferred until the action of the preceding bath is substantially terminated; then effecting saponification in two steps, by the addition of water to destroy the residual acetic anhydride and thereafter, when the temperature is lowered, adding a mixture of hydrochloric and hydrofluoric acids in such quantity that ions developed in the baths from the acetic mixture will at least equal the sulphuric ions introduced in the bath through the catalyzer, and finally precipitating the acetic solution.

7. The herein described process of preparing cellulose acetate, consisting in first subjecting the cellulose material to an alkaline solution containing peroxides, then heating the mass to soften the fibres with a gaseous halogen and vapors of acetic acid, then subjecting the cellulose mass to a series of successive partial acetylation baths each performing part of the acetylation, each addition of acetylating agents being deferred until the action of the preceding bath is substantially terminated, then effecting saponification by addition of water to destroy the residual acetic anhydride and acetic acid to prevent partial flocculation of the solution of acetate and thereafter when the temperature is lowered adding a mixture of hydrochloric and hydrofluoric acids to insure that the ions brought into the bath from the acid mixture will at least equal the sulphuric ions introduced in the bath through the catalyzer and finally precipitating the acetic solution.

In testimony whereof I affix my signature.

HENRI LOUIS BARTHÉLEMY.